US008697794B2

(12) United States Patent
Cochran et al.

(10) Patent No.: US 8,697,794 B2
(45) Date of Patent: Apr. 15, 2014

(54) IMPACT MODIFIED STYRENIC POLYMERS WITH IMPROVED STRESS CRACK PROPERTIES

(75) Inventors: Thomas Cochran, Channahon, IL (US); Jeffrey P. Viola, Manalapan, NJ (US)

(73) Assignee: Styrolution America LLC, Channahon, IL (US)

( * ) Notice: Subject to any disclaimer, the term of this patent is extended or adjusted under 35 U.S.C. 154(b) by 598 days.

(21) Appl. No.: 12/710,514

(22) Filed: Feb. 23, 2010

(65) Prior Publication Data

US 2010/0240834 A1 Sep. 23, 2010

Related U.S. Application Data

(60) Provisional application No. 61/161,438, filed on Mar. 19, 2009.

(51) Int. Cl.

| | |
|---|---|
| ***C08L 51/04*** | (2006.01) |
| ***C08L 9/00*** | (2006.01) |
| ***C08L 23/04*** | (2006.01) |
| ***C08L 23/22*** | (2006.01) |
| ***C08L 25/06*** | (2006.01) |
| ***C08L 33/20*** | (2006.01) |

(52) U.S. Cl.
USPC ................................ 524/490; 525/70; 525/85

(58) Field of Classification Search
USPC ....................................... 524/490; 525/70, 85
See application file for complete search history.

(56) References Cited

U.S. PATENT DOCUMENTS

| | | | | |
|---|---|---|---|---|
| 2,769,804 | A | 11/1956 | Hanson | |
| 2,971,939 | A | 2/1961 | Baer | |
| 3,336,267 | A | 8/1967 | Zimmerman et al. | |
| 3,506,740 | A | 4/1970 | Dempsey et al. | |
| 3,551,523 | A | 12/1970 | Killoran | |
| 3,919,354 | A | 11/1975 | Moore et al. | |
| 3,931,379 | A | 1/1976 | Cruson et al. | |
| 3,987,124 | A | 10/1976 | Hardwicke et al. | |
| 4,031,166 | A | 6/1977 | Bronstert et al. | |
| 4,137,281 | A | 1/1979 | Li et al. | |
| 4,172,861 | A | 10/1979 | Li et al. | |
| 4,328,327 | A | 5/1982 | Tanaka et al. | |
| 4,335,037 | A | 6/1982 | Lordi et al. | |
| 4,336,354 | A | 6/1982 | Lordi et al. | |
| 4,486,570 | A | 12/1984 | Lordi et al. | |
| 4,664,866 | A | 5/1987 | van der Heijden | |
| 4,732,924 | A | 3/1988 | Terada et al. | |
| 4,921,906 | A | 5/1990 | Meyer et al. | |
| 4,985,498 | A | 1/1991 | Shirodkar | |
| 4,987,170 | A | 1/1991 | Ishida et al. | |
| 5,106,696 | A | 4/1992 | Chundury et al. | |
| 5,145,924 | A | 9/1992 | Shero et al. | |
| 5,219,628 | A | 6/1993 | Hathaway et al. | |
| 5,331,048 | A | 7/1994 | Hasselbring | |
| 5,525,651 | A | 6/1996 | Ogoe et al. | |
| 5,543,461 | A | 8/1996 | Nke-Aka et al. | |
| 5,601,889 | A * | 2/1997 | Chundury et al. | 428/34.3 |
| 5,660,776 | A | 8/1997 | Wooden et al. | |
| 5,760,118 | A | 6/1998 | Sinclair et al. | |
| 5,852,124 | A | 12/1998 | Wang et al. | |
| 5,861,455 | A | 1/1999 | Reddy et al. | |
| 6,281,293 | B1 | 8/2001 | Fujii | |
| 6,613,837 | B2 | 9/2003 | Reddy et al. | |
| 6,706,814 | B2 | 3/2004 | Demirors | |
| 6,930,150 | B2 | 8/2005 | Kim | |
| 7,252,866 | B2 | 8/2007 | Tang et al. | |
| 7,294,676 | B2 | 11/2007 | Kwok et al. | |
| 7,662,536 | B2 | 2/2010 | Matsumura et al. | |
| 2002/0151609 | A1 | 10/2002 | Chaudhary et al. | |
| 2004/0001962 | A1 | 1/2004 | Reddy et al. | |
| 2006/0160949 | A1 | 7/2006 | Styranec et al. | |
| 2006/0178543 | A1 | 8/2006 | Krupinski et al. | |
| 2007/0010616 | A1 | 1/2007 | Kapur et al. | |
| 2008/0081137 | A1 | 4/2008 | Kwok et al. | |
| 2010/0256427 | A1 * | 10/2010 | Karjala et al. | 585/18 |

* cited by examiner

*Primary Examiner* — Jeffrey Mullis
(74) *Attorney, Agent, or Firm* — The Webb Law Firm

(57) ABSTRACT

A method of improving the stress crack resistance of an impact modified styrenic polymer comprising (a) combining about 95 to about 99.5 wt. % of an impact modified styrenic polymer with about 0.5 to about 5 wt. % of a polymer solution comprising about 25 to about 75 wt. % polyisobutylene and about 25 to about 75 wt. % of a polyolefin comprising one or more $C_2$ to $C_{12}$ alpha olefins.

20 Claims, No Drawings

IMPACT MODIFIED STYRENIC POLYMERS WITH IMPROVED STRESS CRACK PROPERTIES

CROSS REFERENCE TO RELATED PATENT APPLICATION

The present non-provisional patent application is entitled to and claims, under 35 U.S.C. §119(e), the benefit of U.S. Provisional Patent Application No. 61/161,438, filed Mar. 19, 2009, which is hereby incorporated herein in its entirety by reference.

BACKGROUND OF THE INVENTION

1. Field of the Invention

The present invention is directed to impact modified styrenic polymers, and in particular to high impact modified polystyrene resins, in solid form, that exhibit improved environmental stress crack resistance properties.

2. Description of the Prior Art

A number of applications for impact modified polymers is in areas where there is a high potential for contact with oily or fatty substances. Polyisobutylene (PIB) has been added to high impact modified polystyrene (HIPS) materials during their manufacture to make specialty products with improved stress crack resistance.

For example, U.S. Pat. No. 5,543,461 discloses that HIPS and other impact modified styrenic polymers such as ABS and MBS tend to suffer from environmental stress cracking. On extended exposure to oily or fatty substances, the HIPS tends to craze, then crack and finally break. This disclosure proposes that environmental stress crack resistance (ESCR) of impact modified styrenic polymers may be increased by increasing the particle size of the impact modifier and including a low molecular weight polybutene.

U.S. Pat. Nos. 5,861,455 and 6,613,837 discloses a HIPS material that allegedly exhibits improved environmental stress crack resistance that is formed by utilizing polybutadiene, polyisoprene, and copolymers thereof with styrene, having a Mooney viscosity exceeding about 35 and a gel content of up to about 28%. The disclosure suggests using a combination of lubricant additives to obtain a HIPS material with higher ESCR values than either additive alone could provide.

U.S. Pat. No. 7,294,676 discloses styrenic resin compositions that include a rubber modified styrene maleic anhydride copolymer and polybutene. The polybutene ranges from 0.1 to 8% by weight and has a number average molecular weight from 900 to 2500. The rubber ranges from 4% to 20% by weight and has a particle size from 0.1 micron to 11 microns.

U.S. Patent Application Publication 2006/0178543 discloses a foamed sheet containing a polymer composition including a polymer formed by polymerizing a mixture including styrenic monomers; maleate-type monomers; elastomeric polymers; and low molecular weight polymers that include one or more monomers according to the formula $CH_2CR^3R^2$, where $R^3$ is H or a $C_1$-$C_3$ alkyl group and $R^2$ is a $C_1$-$C_{22}$ linear, branched or cyclic alkyl or alkenyl groups. The foamed sheets can be thermoformed into containers suitable for use in microwave heating of food.

U.S. Patent Application Publication 2008/0081137 discloses a polymer composition that includes a blend of a rubber modified styrene maleic anhydride copolymer, HIPS, a rubber modified styrene methyl methacrylate copolymer and polybutene.

U.S. Patent Application Publication 2006/0160949 discloses a thermoplastic sheet containing a polymer formed by polymerizing a mixture including styrenic monomers; maleate-type monomers; elastomeric polymers with Mn greater than 12,000; and low molecular weight polymers, having Mn of from 400 to 12,000, that include one or more monomers according to the formula $CH_2CR^3R^2$, where $R^3$ is H or a $C_1$-$C_3$ alkyl group and $R^2$ is a $C_1$-$C_{22}$ linear, branched or cyclic alkyl or alkenyl groups.

An issue with the foregoing compositions is that the polybutene is a very thick liquid that requires specialized equipment for handling due to its very high viscosity and sticky consistency. It would be beneficial for polystyrene compounders to be able to add polybutene themselves as needed to tailor standard HIPS products to achieve the level of ESCR needed for specific applications. However, polystyrene compounders do not typically have the specialized equipment needed to handle polybutene in this viscose liquid form.

Thus, it would be desirable to provide polybutene to polystyrene compounders in a form that would enable them to conveniently blend polybutene into HIPS and other impact modified styrenic resin compositions.

SUMMARY OF THE INVENTION

The present invention provides a method of improving the stress crack resistance of an impact modified styrenic polymer that includes combining about 95 to about 99.5 wt. % of an impact modified styrenic polymer with about 0.5 to about 5 wt. % of a polymer solution containing about 25 to about 75 wt. % polyisobutylene and about 25 to about 75 wt. % of a polyolefin comprising one or more $C_2$ to $C_{12}$ alpha olefins.

The present invention also provides impact modified styrenic polymers prepared according to the method described above.

DETAILED DESCRIPTION OF THE INVENTION

Other than in the operating examples or where otherwise indicated, all numbers or expressions referring to quantities of ingredients, reaction conditions, etc. used in the specification and claims are to be understood as modified in all instances by the term “about”. Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of “1 to 10” is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values.

Unless expressly indicated otherwise, the various numerical ranges specified in this application are approximations.

As used herein, the term “elastomeric material” refers to natural and synthetic materials that deform when stress is applied and return to their original configuration when the stress is removed.

As used herein, the term “high impact polystyrene” or “HIPS” refers to rubber modified polystyrene, a non-limiting example of which includes HIPS prepared by adding polybutadiene, or other elastomeric materials, to styrene monomer during polymerization so it can become chemically bonded to the polystyrene, forming a graft copolymer which helps to incorporate impact modifying polymers into the final resin composition.

As used herein, the term “impact modifying polymer” refers to elastomeric materials that can be used to make impact modified and/or high impact polystyrene and include, without limitation, polymeric materials containing monomer residues from styrene, butadiene, isoprene, acrylonitrile, ethylene, $C_3$ to $C_{12}$ alpha olefins, and combinations thereof.

Unless otherwise specified, all molecular weight values are determined using gel permeation chromatography (GPC) using appropriate polystyrene standards. Unless otherwise indicated, the molecular weight values indicated herein are weight average molecular weights (Mw).

As used herein, the term “monomer residues” refers to the monomeric repeat unit in a polymer derived from addition polymerization of a molecule containing a polymerizable unsaturated group.

As used herein, the term “polymer” is meant to encompass, without limitation, homopolymers, copolymers and graft copolymers.

As used herein, the terms “polyisobutylene” or “PIB” refer to a polymer derived from one or more monomers according to the formula $CH_2CR^3R^2$, where $R^3$ is a $C_1$-$C_3$ alkyl group and $R^2$ is a $C_1$-$C_{22}$ linear, branched or cyclic alkyl group.

As used herein, the term “polyolefin” refers to a polymer derived from one or more α-olefin monomers according to the formula $CH_2CHR^2$, where $R^2$ is H or a $C_1$-$C_{22}$ linear, branched or cyclic alkyl group and includes without limitation polyethylene, low density polyethylene, linear low density polyethylene, substantially linear ethylene polymers, high density polyethylene and polypropylene.

As used herein, the term “solubility parameter” refers to the Hildebrand solubility parameter, which is generally the square root of the cohesive energy density of a material, a characteristic of a polymer used in predicting the solubility of that polymer in a given solvent. The solubility parameter for a polymer can be taken as the value of the solubility parameter of a solvent that produces the solution with the maximum intrinsic viscosity or the maximum swelling of a network polymer.

As used herein, the term “styrenic polymer” refers to a polymer that contains residues from one or more monomers selected from styrene, p-methyl styrene, tertiary butyl styrene, dimethyl styrene, nuclear brominated or chlorinated derivatives thereof and combinations thereof.

In the present invention, the stress crack resistance of an impact modified styrenic polymer is improved by conveniently adding polyisobutylene (PIB), in the form of a polymer solution containing from about 25 to about 75 wt. % PIB and about 25 to about 75 wt. % of a polyolefin to an impact modified styrenic polymer.

A master batch concentrate of PIB in a polyolefin is formed in order to convert the difficult to process liquid PIB into easier to process coarse solid particles. However, PIB and polystyrene differ in their chemical nature to the extent that concentrations may be limited to 20-25% PIB. Above this point, the surface becomes sticky and the master batch is difficult to process.

If dilute concentrations of PIB are used in a master batch, a high concentration of master batch would be required in the final polystyrene resin. As a non-limiting example, in order to obtain a PIB concentration of 2% by weight in a HIPS resin, the master batch would have to make up 10% weight percent of the final HIPS resin. Adding this amount of a master batch would not be practical from a cost standpoint and the change in physical properties attributable to the amount of master batch in the resin would be detrimental to performance.

In embodiments of the present invention, the styrenic polymer contains monomer residues from styrenic monomers selected from styrene, p-methyl styrene, tertiary butyl styrene, dimethyl styrene, nuclear brominated or chlorinated derivatives thereof and combinations thereof. As described herein, the particular styrenic polymer used will depend on the nature of the other components of the present impact modified styrenic polymer in order to provide the desired stress crack resistance. Chain length of the styrenic polymer typically ranges from a weight average molecular weight of 150,000 to 260,000.

In embodiments of the invention, the impact modifying polymer in the impact modified styrenic polymer contains monomer residues selected from styrene, butadiene, isoprene, acrylonitrile, ethylene, $C_3$ to $C_{12}$ alpha olefins, and combinations thereof.

In particular embodiments of the invention, the impact modifying polymer can be a rubbery polymer containing an ethylenic unsaturation. In some cases, the impact modifying polymer can be a co- or homo-polymer of one or more $C_{4-6}$ conjugated diolefins. In some particular embodiments, the impact modifying polymer includes or can be polybutadiene. The polybutadiene can be a medium or high cis-polybutadiene. Typically the high cis-polybutadiene contains not less than 90%, in some cases more than about 93 weight % of the polymer in the cis-configuration. In many instances, medium cis-polybutadiene has a cis content from about 30 to 50, in some cases from about 35 to 45 weight %. Suitable polybutadiene rubbery polymers that can be used in the invention include, but are not limited to those commercially available from a number of sources; non-limiting examples including Taktene® 550T available from Lanxess Corporation (Pittsburgh, Pa.); SE PB-5800 available from the Dow Chemical Company (Midland, Mich.); and Diene® 55AC15 and Diene® 70AC15 available from Firestone Polymers, LLC (Akron, Ohio).

In particular embodiments of the invention, the impact modifying polymer can include one or more block copolymers, which can be rubbery block copolymers. In some cases, the block copolymers include one or more diblock and triblock copolymers of styrene-butadiene, styrene-butadiene-styrene, styrene-isoprene, styrene-isoprene-styrene and partially hydrogenated styrene-isoprene-styrene. Examples of suitable block copolymers include, but are not limited to, the STEREON® block copolymers available from Firestone; the ASAPRENE™ block copolymers Tufprene® elastomers available from Asahi Kasei Chemicals Corporation, Tokyo, Japan; the KRATON® block copolymers available from Kraton Polymers, Houston, Tex.; and the VECTOR® block copolymers available from Dexco Polymers LP, Houston, Tex., non-limiting examples of such include Asahi's Tufprene® A, Desco's Vector® 6241, and Kraton's D1155BJ.

In other particular embodiments of the invention, the block copolymer can be a linear or radial block copolymer.

In many embodiments of the invention, the block copolymer can have a weight average molecular weight of at least 50,000 and in some cases not less than about 75,000, and can be up to 500,000, in some cases up to 400,000 and in other cases up to 300,000. The weight average molecular weight of the block copolymer can be any value or can range between any of the values recited above.

In some embodiments of the invention, the block copolymer can be a triblock styrene-butadiene-styrene or styrene-isoprene-styrene copolymer having a weight average molecular weight of from about 175,000 to about 275,000.

As described herein, the particular impact modifying polymer used will depend on the nature of the other components of the present impact modified styrenic polymer in order to provide the desired stress crack resistance.

In particular embodiments of the invention, the impact modified styrenic polymer can include PS 496N, PS 476M, PS 2710, PS 2720, PS 486N, 5400, 6200 and/or 5410, all available from INEOS NOVA LLC, Channahon, Ill. As described herein, the particular impact modified styrenic polymer used will depend on the nature of the other components of the present impact modified styrenic polymer composition in order to provide the desired stress crack resistance.

The HIPS resin can be prepared, as a non-limiting example, according to the methods disclosed in U.S. Pat. Nos. 5,543,461, 5,861,455 and 6,613,837, the relevant portions of which are herein incorporated by reference.

The HIPS can be present in the impact modified styrenic polymer of the present invention at a level of at least about 95, in some cases at least about 95.5, in other cases at least about 96 and in some instances at least about 96.5 percent by weight of the overall impact modified styrenic polymer composition. Also, the HIPS can be present at a level of up to about 99.5, in some cases up to about 99, in other cases up to about 98.5 and in some instances up to about 98 percent by weight of the overall inventive impact modified styrenic polymer. The amount of HIPS in the impact modified styrenic polymer of the present invention can be any value or range between any of the values recited above.

In particular embodiments of the invention, the PIB can be a polymer prepared by polymerizing isobutylene.

In embodiments of the invention, the PIB can have a number average molecular weight (Mn) of at least about 900, in some cases at least about 950, and in other cases at least about 1000 and up to about 2500, in some cases up to about 2000, in other cases up to about 1500 and in some instances up to about 1300. As described herein, the particular PIB used will depend on the nature of the other components of the present impact modified styrenic polymer in order to provide the desired stress crack resistance.

The PIB can be present in the impact modified styrenic polymer of the present invention at a level of at least about 0.25, in some cases at least about 0.5, in other cases at least about 0.75 and in some instances at least about 1 percent by weight of the overall impact modified styrenic polymer composition. Also, the PIB can be present in the impact modified styrenic polymer of the present invention at a level of up to about 4.25, in some cases up to about 3.5, in other cases up to about 3 and in some instances up to about 2.75 percent by weight of the overall impact modified styrenic polymer composition. The amount of PIB in the present impact modified styrenic polymer will vary based on the concentration of PIB in the polymer solution, the nature of the polyolefin, the nature of the HIPS and the particular stress crack resistance properties desired. The amount of PIB in the present impact modified styrenic polymer can be any value or range between any of the values recited above.

In the present invention, a polyolefin is used as a carrier resin to deliver PIB to a HIPS composition to provide improved stress crack resistance. Thus, a concentrated solution of PIB in the polyolefin is prepared for subsequent blending into the HIPS composition.

In the present invention, it has been found that by selecting styrenic polymers, impact modifying polymers, HIPS, PIB and/or polyolefin components such that the solubility parameter of each are sufficiently similar, the stress crack resistance of the resulting impact modified styrenic polymer can be improved, compared to impact modified styrenic polymers that do not contain the PIB/polyolefin solution.

In embodiments of the invention, a solution of PIB in linear low and low density polyethylene can be used. Solutions having a PIB content of from 60% to 66% by weight in linear low density polyethylene are available commercially from, as non-limiting examples, Polytechs S.A.S. (Cany Barville, France) or Compound Solutions (Twinsburg, Ohio) as PW60 and PW66, and from Colortech (Brampton, Ontario, Canada) as Cling Concentrate 103590-41.

The PIB can be present in the polymer solution of PIB in polyolefin of the present invention at a level of at least about 25, in some cases at least about 35, in other cases at least about 50 and in some instances at least about 60 percent by weight of the overall impact modified styrenic polymer composition. Also, the PIB can be present in the polymer solution of the present invention at a level of up to about 75, in some cases up to about 70, in other cases up to about 68 and in some instances up to about 66 percent by weight of the overall polymer solution. The amount of PIB in the polymer solution varies based on the nature of the PIB, the nature of the polyolefin, the viscosity of the polymer solution and the tackiness of the polymer solution. The amount of PIB in the polymer solution in the present invention can be any value or range between any of the values recited above.

The polyolefin can be present in the polymer solution of PIB in polyolefin of the present invention at a level of at least about 25, in some cases at least about 30, in other cases at least about 32 and in some instances at least about 34 percent by weight of the overall impact modified styrenic polymer composition. Also, the polyolefin can be present in the polymer solution of the present invention at a level of up to about 75, in some cases up to about 65, in other cases up to about 50 and in some instances up to about 40 percent by weight of the overall polymer solution. The amount of polyolefin in the polymer solution varies based on the nature of the PIB, the nature of the polyolefin, the viscosity of the polymer solution and the tackiness of the polymer solution. The amount of polyolefin in the polymer solution in the present invention can be any value or range between any of the values recited above.

The polymer solution of PIB in polyolefin can be present in the impact modified styrenic polymer of the present invention at a level of at least about 0.5, in some cases at least about 1, in other cases at least about 1.5 and in some instances at least about 2 percent by weight of the overall impact modified styrenic polymer composition. Also, the polymer solution can be present in the impact modified styrenic polymer of the present invention at a level of up to about 5, in some cases up to about 4.5, in other cases up to about 4 and in some instances up to about 3.5 percent by weight of the overall impact modified styrenic polymer composition. The amount of polymer solution in the present impact modified styrenic polymer will vary based on the concentration of PIB in the polymer solution, the nature of the polyolefin, the nature of the HIPS and the particular stress crack resistance properties desired. The amount of polymer solution in the present impact modified styrenic polymer can be any value or range between any of the values recited above.

In particular embodiments as further described below, the PIB/polyolefin solution used to prepare the present impact modified styrenic polymers is selected such that the free energy of mixing for the PIB and polyolefin is very low (less than zero). In many embodiments of the present invention, the solubility parameter of the components of the PIB/polyolefin solution are sufficiently similar to the solubility parameters of the HIPS components to provide that the resulting thermodynamic interaction parameter values ($\chi$) for the admixture are less than 0.5.

The "free energy of mixing" is defined as $\Delta G=\Delta H-T\Delta S$, where G is the Gibb's free energy, H is enthalpy, S is entropy and T is temperature. In simple terms, when the free energy of mixing ($\Delta G$) of two components is a positive value, the two components are immiscible and will phase separate. For example, in the hypothetical instance where the PIB/polyolefin solution and HIPS are substantially immiscible components, they will tend to partition, which leads to a higher susceptibility for stress cracking. Also, $\Delta G$ for a binary mixture containing a component 1 and a component 2 may be defined by the following equation:

$$\Delta G=RT[(n_1 \ln X_1+n_2 \ln X_2)+\chi n_1 X_2]$$

where R is the gas constant, T is temperature, X is the volume fraction of component 1 or 2, n is the number of particles, and $\chi$ ("chi") represents the thermodynamic interaction parameter. The thermodynamic interaction parameter ($\chi$ or "chi") is defined as the difference in the energy of mixing of components 1 and 2. This can be represented by the following equation:

$$X=(\Delta E_{mix}/RT)V_m$$

where $V_m$ is the average molar volume ("reference segment volume") and R and T are defined above. "Chi" may also be defined as the difference in solubility parameter (SP) of two materials.

$$X=V_m(\delta_1-\delta_2)^2/RT$$

where $\delta$ is the Hildebrand solubility parameter. The solubility parameter may be computed from a value known as the cohesive energy density ("ced") of a material. The "ced" is related to the heat of vaporization of a material, that is, how much energy is required to remove a single molecule from the bulk. For polymeric systems where the assumption that the entropy of mixing is exceedingly small, the free energy expressions reduce to the energy of mixing itself, that is $\Delta G=\Delta H$, and a theoretical critical point exists where two materials become immiscible (phase separate) when "chi" is greater than 0.5. For regular solutions, (low molecular weight species) this critical point has a value of 2.0. So, in the present invention, it is desirable that the value of "chi" for the PIB/polyolefin solution and HIPS mixture is less than 0.5.

To summarize, from first principles, the "ced" for a bulk material can be computed. The "ced" is directly related to the solubility parameter ($\delta$) as indicated above. The thermodynamic interaction parameter "chi" ($\chi$) can be computed from the differences in the solubility parameter ($\delta$) for each of the two materials. "Chi" along with relative fractions of materials in a mixture may be used to compute the free energy of mixing ($\Delta G$). If $\Delta G$ is a negative value, the mixture is thermodynamically stable and phase separation should not occur. Critical points for this condition are values of "chi" of 0.5 and less for higher molecular weight materials such as the polymeric components of the PIB/polyolefin solution and HIPS mixture. See as a non-limiting example at page 10, line 35 to page 11, line 27 of U.S. Pat. No. 7,329,468.

In embodiments of the invention, the difference between the solubility parameter of the PIB and the solubility parameter of the polyolefin is not more than 1 (cal/cm$^3$)$^{1/2}$ [2 (J/cm$^3$)$^{1/2}$], in some cases not more than 0.75 (cal/cm$^3$)$^{1/2}$ [1.5 (J/cm$^3$)$^{1/2}$], and in other cases not more than 0.5 (cal/cm$^3$)$^{1/2}$ [1 (J/cm$^3$)$^{1/2}$].

In the above case and throughout this application, the solubility parameters referenced are taken to be those at a temperature of 25° C.

In embodiments of the invention, the difference between the solubility parameters of the components of the PIB/polyolefin mixture and the solubility parameter of the styrenics polymer is not more than 1.5 (cal/cm$^3$)$^{1/2}$ [3.1 (J/cm$^3$)$^{1/2}$], in some cases not more than 1.25 (cal/cm$^3$)$^{1/2}$ [2.6 (J/cm$^3$)$^{1/2}$], and in other cases not more than 1 (cal/cm$^3$)$^{1/2}$ [2 (J/cm$^3$)$^{1/2}$].

In embodiments of the invention, the difference between the solubility parameters of the components of the PIB/polyolefin mixture and the solubility parameter of the impact modifying polymer is not more than 1 (cal/cm$^3$)$^{1/2}$, in some cases not more than 0.75 (cal/cm$^3$)$^{1/2}$, and in other cases not more than 0.5 (cal/cm$^3$)$^{1/2}$.

The exact solubility parameter of a particular polymer can vary based on its exact composition, amount of branching, molecular weight and molecular weight distribution. As such, the solubility parameter ($\delta$) for polyisobutylenes used in the present invention can be at least about 7.7 (cal/cm$^3$)$^{1/2}$ [15.8 (J/cm$^3$)$^{1/2}$], in some cases at least about 7.75 (cal/cm$^3$)$^{1/2}$ [15.9 (J/cm$^3$)$^{1/2}$] and in other cases at least about 7.8 (cal/cm$^3$)$^{1/2}$ [16.0 (J/cm$^3$)$^{1/2}$] and can be up to about 8.2 (cal/cm$^3$)$^{1/2}$ [16.8 (J/cm$^3$)$^{1/2}$], in some cases up to about 8.1 (cal/cm$^3$)$^{1/2}$ [16.6 (J/cm$^3$)$^{1/2}$] and in other cases up to about 8 (cal/cm$^3$)$^{1/2}$ [16.4 (J/cm$^3$)$^{1/2}$]. In particular embodiments, the solubility parameter ($\delta$) for the polyisobutylene can be 7.85 (cal/cm$^3$)$^{1/2}$ [16.1 (J/cm$^3$)$^{1/2}$]. The solubility parameter ($\delta$) for the polyisobutylenes used in the present invention can be any value or range between any of the values recited above.

The solubility parameter ($\delta$) for the polyolefins used in the present invention can be at least about 7.7 (cal/cm$^3$)$^{1/2}$ [15.8 (J/cm$^3$)$^{1/2}$], in some cases at least about 7.75 (cal/cm$^3$)$^{1/2}$ [15.9 (J/cm$^3$)$^{1/2}$] and in other cases at least about 7.8 (cal/cm$^3$)$^{1/2}$ [16.0 (J/cm$^3$)$^{1/2}$] and can be up to about 8.4 (cal/cm$^3$)$^{1/2}$ [17.2 (J/cm$^3$)$^{1/2}$], in some cases up to about 8.3 (cal/cm$^3$)$^{1/2}$ [17.0 (J/cm$^3$)$^{1/2}$] and in other cases up to about 8.2 (cal/cm$^3$)$^{1/2}$ [16.8 (J/cm$^3$)$^{1/2}$]. In particular embodiments, the solubility parameter ($\delta$) for the polyolefins can be 7.9 (cal/cm$^3$)$^{1/2}$ [16.2 (J/cm$^3$)$^{1/2}$] or 8.1 (cal/cm$^3$)$^{1/2}$ [16.6 (J/cm$^3$)$^{1/2}$]. The solubility parameter ($\delta$) for the polyolefins used in the present invention can be any value or range between any of the values recited above.

The solubility parameter ($\delta$) for the impact modifying polymer used in the present invention can be at least about 8.3 (cal/cm$^3$)$^{1/2}$ [17.0 (J/cm$^3$)$^{1/2}$] and in some cases at least about 8.4 (cal/cm$^3$)$^{1/2}$ [17.2 (J/cm$^3$)$^{1/2}$] and can be up to about 8.6 (cal/cm$^3$)$^{1/2}$ [17.6 (J/cm$^3$)$^{1/2}$] and in some cases up to about 8.5 (cal/cm$^3$)$^{1/2}$ [17.4 (J/cm$^3$)$^{1/2}$]. The solubility parameter ($\delta$) for the impact modifying polymer used in the present invention can be any value or range between any of the values recited above.

The solubility parameter ($\delta$) for the styrenic polymers used in the present invention can be at least about 8.5 (cal/cm$^3$)$^{1/2}$ [ 17.4 (J/cm$^3$)$^{1/2}$], in some cases at least about 8.6 (cal/cm$^3$)$^{1/2}$ [ 17.6 (J/cm$^3$)$^{1/2}$] and in other cases at least about 8.7 (cal/cm$^3$)$^{1/2}$ [17.8 (J/cm$^3$)$^{1/2}$] and can be up to about 9.3 (cal/cm$^3$)$^{1/2}$ [ 19.0 (J/cm$^3$)$^{1/2}$], in some cases up to about 9.2 (cal/cm$^3$)$^{1/2}$ [ 18.8 (J/cm$^3$)$^{1/2}$] and in other cases up to about 9.1 $(cal/cm^3)^{1/2}$ [18.6 $(J/cm^3)^{1/2}$]. In particular embodiments, the solubility parameter (δ) for the styrenic polymers can be 9 $(cal/cm^3)^{1/2}$ [18.4 $(J/cm^3)^{1/2}$] or 8.8 $(cal/cm^3)^{1/2}$ [18.0 $(J/cm^3)^{1/2}$]. The solubility parameter (δ) for the styrenic polymers used in the present invention can be any value or range between any of the values recited above.

The PIB/polyolefin solution can be prepared by kneading and extruding in a single screw extruder in the manner described by U.S. Pat. No. 4,929,680. The PIB/polyolefin solution may then be compounded into the HIPS using single screw extrusion, twin screw extrusion, of any other technique that is typically used to compound masterbatches and additives into the HIPS.

The impact modifying polymer particles in the impact modified styrenic polymers of the invention typically have a particle size of at least about 1 μm, in some cases at least about 1.5 μm and in other cases at least about 2 μm and can be up to about 12 μm, in some cases up to about 11 μm and in other cases up to about 10 μm. The particle size of the impact modifying polymer particles in the impact modified styrenic polymers can be any value or range between any of the values recited above. The impact modifying polymer particle size is typically measured by analyzing the spectra obtained from light scattering through a solution of the particles in a polystyrene solvent such as methyl ethyl ketone or ethyl acetate. Instruments suitable for this include Horiba's Model LA-920 or Beckman Coulter's LS 13 320.

The impact modified styrenic polymers of the invention typically have an environmental stress crack resistance (ESCR), as measured on extruded strands at 2000 psi constant external stress with constant exposure to a 50/50 solution of cotton seed oil/oleic acid, of at least 50, in some cases at least about 55, in other cases at least about 60 and in particular cases at least about 70 minutes to failure. The ESCR value will depend on the nature of the PIB, the nature of the PIB/polyolefin polymer solution and the nature of the HIPS.

Further, the impact modified styrenic polymers of the invention typically have a constant stress ESCR that is at least about 20, in some cases at least about 25, in other cases at least about 30 and in particular cases at least about 50 percent longer than the constant stress ESCR of the same HIPS material not containing the PIB/polyolefin polymer solution of the present invention. The percent improvement in ESCR when employing the present invention will depend on the nature of the PIB, the nature of the PIB/polyolefin polymer solution and the nature of the HIPS.

Constant strain ESCR testing is conducted by comparing the ultimate elongation of sets of specimen, one set exposed to 50/50 cotton seed oil/oleic acid and one set unexposed, after confining them to 0.9% strain for 24 hours. The percent elongation retention is referred to as the fraction of elongation of the unexposed set that is retained by the exposed set. The impact modified styrenic polymers of the invention typically have a percent elongation retention of at least 40, in some cases at least about 45, in other cases at least about 50 and in particular cases at least about 60 percent. The elongation retention value will depend on the nature of the PIB, the nature of the PIB/polyolefin polymer solution and the nature of the HIPS.

Further, the impact modified styrenic polymers of the invention typically have a constant strain ESCR that is at least about 50, in some cases at least about 55, in other cases at least about 60 and in particular cases at least about 70 percent higher than the constant strain ESCR of the same HIPS material not containing the PIB/polyolefin polymer solution of the present invention. The percent improvement in ESCR when employing the present invention will depend on the nature of the PIB, the nature of the PIB/polyolefin polymer solution and the nature of the HIPS.

In embodiments of the invention, the impact modified styrenic polymers of the invention typically have a VICAT heat distortion temperature measured according to ASTM-D1525 of at least 95° C., in some cases at least about 96° C. and in other cases at least about 97° C. and can be up to about 105° C., in some cases up to about 104° C. and in other cases up to about 103° C. The VICAT heat distortion temperature of the present impact modified styrenic polymers can be any value or range between any of the values recited above.

In embodiments of the invention, the impact modified styrenic polymers of the invention typically have an IZOD notched impact measured according to ASTM-D256 of at least 1.5 ft-lb/in, in some cases at least about 1.6 ft-lb/in and in other cases at least about 1.7 ft-lb/in and can be up to about 2.7 ft-lb/in, in some cases up to about 2.6 ft-lb/in and in other cases up to about 2.5 ft-lb/in. The IZOD notched impact of the present impact modified styrenic polymers can be any value or range between any of the values recited above.

In embodiments of the invention, the impact modified styrenic polymers of the invention are unique in combining high ESCR performance and high gloss. Typically, these two desirable properties are mutually exclusive. The impact modified styrenic polymers of the invention typically have a specular gloss measured according to ASTM D-523 with a 60 degrees viewing angle of at least 10, in some cases at least about 12, in other cases at least about 14 and in particular embodiments at least 50 and can be up to about 75, in some cases up to about 70 and in other cases up to about 67. The specular gloss of the present impact modified styrenic polymers can be any value or range between any of the values recited above.

In embodiments of the invention, the impact modified styrenic polymers of the invention typically have a tensile stress at yield measured according to ASTM D638 of at least 2,300 psi, in some cases at least about 2,800 psi, in other cases at least about 3,000 psi and in particular embodiments at least about 3,300 psi.

In embodiments of the invention, the impact modified styrenic polymers of the invention typically have a tensile strain at break measured according to ASTM D638 of at least 28%, in some cases at least about 40%, in other cases at least about 45% and in particular embodiments at least about 50%.

In embodiments of the invention, the impact modified styrenic polymers of the invention typically have a tensile modulus measured according to ASTM D638 of at least 195 kpsi, in some cases at least about 200 kpsi, in other cases at least about 210 kpsi and in particular embodiments at least about 220 kpsi.

In embodiments of the invention, the impact modified styrenic polymers of the invention typically have a flexural modulus measured according to ASTM D790 of at least 250 kpsi, in some cases at least about 260 kpsi, in other cases at least about 270 kpsi and in particular embodiments at least about 280 kpsi.

The present invention will further be described by reference to the following examples. The following examples are merely illustrative of the invention and are not intended to be limiting. Unless otherwise indicated, all percentages are by weight.

EXAMPLES

In the Examples, ESCR was measured according to the constant stress and constant strain methods described above, the VICAT heat distortion temperature was measured according to ASTM-D1525, the specular gloss was measured according to ASTM D-523 with a 60 degrees viewing angle, the tensile stress at yield, tensile strain at break and Tensile modulus were measured according to ASTM D638, and the flexural modulus was measured according to ASTM D790. The results are tabulated in the Tables below.

Example 1

This example compares the physical properties of a HIPS polymer with the same HIPS polymer containing the PIB/polyolefin solution according to the present method. A 60% solution of PIB having a number average molecular weight (Mn) of 1250 with estimated solubility parameter of 7.8 $(cal/cm^3)^{1/2}$ in a linear low density polyethylene (LLDPE) with estimated solubility parameter of 7.9 $(cal/cm^3)^{1/2}$ was compounded using a Brabender ¾" single screw extruder with barrel temperature of 200° C. into Impact PS 496N (HIPS available from INEOS NOVA), which is a grade with a balance of rigidity and toughness typically used in sheet extrusion applications, at levels of 2.5 and 4.0% by weight. The Impact PS is comprised of a styrenics polymer matrix with estimated solubility parameter of 9.1 $(cal/cm^3)^{1/2}$ and impact modifying polymer with estimated solubility parameter of 8.4 $(cal/cm^3)^{1/2}$. Test specimen were injection molded using an All-Rounder 221-55-230 (ARBURG GmbH+Co KG, Lossburg, Germany) with a barrel temperature of 240° C. and mold temperature of 65° C. The results are shown in the table below (the designation (c) indicates a prior art control sample for comparison).

| | Sample No. | | | | | |
|---|---|---|---|---|---|---|
| | A | B | C | D | E | F |
| HIPS (wt. %) | 100 (c) | 97.5 | 96 | 100 (c) | 97.5 | 96 |
| PIB/LLDPE solution (wt. %) | 0 (c) | 2.5 | 4 | 0 (c) | 2.5 | 4 |
| Constant stress ESCR (minutes to failure) | 24 | 54 | 90 | 26 | 65 | 66 |
| Constant stress ESCR (% improvement over control) | | 125 | 276 | | 150 | 152 |
| MFR (g/10 min.) | 3.2 | 3.6 | 6.2 | 3.1 | 3.3 | 3.8 |
| Rubber Particle Size (μm) | 2.2 | | | 2.2 | | |
| Vicat (° C.) | 99.7 | 100.1 | 100.1 | 100.1 | 100.1 | 100.2 |
| Izod Impact Strength (ft-lb/in) | 2.5 | 2.4 | 2.2 | 2.2 | 2.0 | 1.9 |
| Specular Gloss at 60° | 61 | 57 | 50 | 67 | 67 | 57 |
| Tensile Stress at Yield (psi) | 3202 | 3142 | 3227 | 3277 | 3229 | 3218 |
| Tensile Strain at Break (%) | 55 | 65 | 53 | 60 | 28 | 45 |
| Tensile Modulus (kpsi) | 246 | 236 | 231 | 256 | 245 | 232 |
| Flexural Modulus (kpsi) | 291 | 288 | 289 | 312 | 298 | 290 |

As the data show, the constant stress ESCR doubled at the lower loading and improved further at the higher loading. Any reduction in physical property values is within practical commercial tolerances. An additional benefit observed was that the processibility of the present impact modified styrenic polymer was also improved.

Further, the samples of the present impact modified styrenic polymer in this example (containing the PIB/LLDPE polymer solution) demonstrated a unique combination of high ESCR performance and high gloss. Typically, these two desirable properties are mutually exclusive.

Example 2

This example compares the physical properties of a HIPS polymer with the same HIPS polymer containing the PIB/polyolefin solution according to the present method. The 60% PIB in LLDPE of Examples 1 was compounded into Impact PS 476N (HIPS available from INEOS NOVA), a sheet extrusion grade with good ESCR and processibility properties, at a level of 2.5% by weight. The Impact PS is comprised of a styrenics polymer matrix with estimated solubility parameter of 9.1 $(cal/cm^3)^{1/2}$ and impact modifying polymer with estimated solubility parameter of 8.4 $(cal/cm^3)^{1/2}$. The results are shown in the table below (the designation (c) indicates a prior art control sample for comparison).

| | Sample No. | | | |
|---|---|---|---|---|
| | G | H | I | J |
| HIPS (wt. %) | 100 (c) | 97.5 | 100 (c) | 97.5 |
| PIB/LLDPE solution (wt. %) | 0 (c) | 2.5 | 0 (c) | 2.5 |
| Constant stress ESCR (minutes to failure) | 68 | 93 | 117 | 228 |
| Constant stress ESCR (% improvement over control) | | 37 | | 95 |
| Elongation retention (%) | 30 | 50 | 10 | 59 |
| Constant strain ESCR (% improvement over control) | | 68 | | 505 |
| MFR (g/10 min.) | 3.7 | 4.2 | 3.4 | 3.9 |
| Rubber Particle Size (μm) | 5.7 | | 5.5 | |

-continued

| | Sample No. | | | |
|---|---|---|---|---|
| | G | H | I | J |
| Vicat (° C.) | 100.7 | 100.5 | 100.6 | 100.5 |
| Izod Impact Strength (ft-lb/in) | 2.3 | 2.2 | 2.4 | 1.9 |
| Specular Gloss at 60° | 21 | 18 | 25 | 24 |
| Tensile Stress at Yield (psi) | 2689 | 2672 | 2826 | 2743 |
| Tensile Strain at Break (%) | 69 | 83 | 67 | 74 |
| Tensile Modulus (kpsi) | 224 | 212 | 237 | 224 |
| Flexural Modulus (kpsi) | 263 | 263 | 298 | 283 |

As the data show, the constant stress ESCR and the constant strain ESCR significantly improved with the present impact modified styrenic polymer compared with the same HIPS not containing the PIB/LLDPE solution. Any reduction in physical property values is within practical commercial tolerances.

Example 3

This example compares the physical properties of a HIPS polymer with the same HIPS polymer containing the PIB/polyolefin solution according to the present method. The 60% PIB in LLDPE of Examples 1 and 2 was compounded into Impact PS 2710 (INEOS NOVA), a high ESCR grade typically used for extrusion and thermoforming applications, at a level of 2.5% by weight. The Impact PS is comprised of a styrenics polymer matrix with estimated solubility parameter of 9.1 $(cal/cm^3)^{1/2}$ and impact modifying polymer with estimated solubility parameter of 8.4 $(cal/cm^3)^{1/2}$. The results are shown in the table below (the designation (c) indicates a prior art control sample for comparison).

| | Sample No. | | | |
|---|---|---|---|---|
| | K | L | M | N |
| HIPS (wt. %) | 100 (c) | 97.5 | 100 (c) | 97.5 |
| PIB/LLDPE solution (wt. %) | 0 (c) | 2.5 | 0 (c) | 2.5 |
| Constant stress ESCR (minutes to failure) | 154 | 194 | 161 | 299 |
| Constant stress ESCR (% improvement over control) | | 26 | | 85 |
| Elongation retention (%) | 60 | 100 | 43 | 98 |
| Constant strain ESCR (% improvement over control) | | 66 | | 125 |
| MFR (g/10 min.) | 2.9 | 3.4 | 3.0 | 3.4 |
| Rubber Particle Size (μm) | 7.8 | | 7.8 | |
| Vicat (° C.) | 101.1 | 101.0 | 101.3 | 101.1 |
| Izod Impact Strength (ft-lb/in) | 2.2 | 2.1 | 2.2 | 1.8 |
| Specular Gloss at 60° | 18 | 14 | 22 | 25 |
| Tensile Stress at Yield (psi) | 2559 | 2537 | 2646 | 2577 |
| Tensile Strain at Break (%) | 56 | 70 | 64 | 73 |
| Tensile Modulus (kpsi) | 218 | 202 | 229 | 217 |
| Flexural Modulus (kpsi) | 259 | 254 | 281 | 267 |

As the data show, the constant stress ESCR and the constant strain ESCR significantly improved with the present impact modified styrenic polymer compared with the same HIPS not containing the PIB/LLDPE solution. Any reduction in physical property values is within practical commercial tolerances.

Example 4

This example compares the physical properties of a HIPS polymer with the same HIPS polymer containing the PIB/polyolefin solution according to the present method. The 60% PIB in LLDPE of Examples 1-3 was compounded into Impact 5410 (INEOS NOVA), a high ESCR grade used for sheet extruded and thermoformed parts with a matte finish, at a level of 2.5% by weight. The Impact PS is comprised of a styrenics polymer matrix with estimated solubility parameter of 9.1 $(cal/cm^3)^{1/2}$ and impact modifying polymer with estimated solubility parameter of 8.4 $(cal/cm^3)^{1/2}$. The results are shown in the table below (the designation (c) indicates a prior art control sample for comparison).

| | Sample No. | | | |
|---|---|---|---|---|
| | K | L | M | N |
| HIPS (wt. %) | 100 (c) | 97.5 | 100 (c) | 97.5 |
| PIB/LLDPE solution (wt. %) | 0 (c) | 2.5 | 0 (c) | 2.5 |
| Constant stress ESCR (minutes to failure) | 141 | 274 | 147 | 318 |
| Constant stress ESCR (% improvement over control) | | 95 | | 116 |
| Elongation retention (%) | 32 | 60 | 43 | 75 |
| Constant strain ESCR (% improvement over control) | | 85 | | 74 |
| MFR (g/10 min.) | 3.8 | 4.0 | 4.1 | 4.0 |
| Rubber Particle Size (μm) | 8.3 | | 9.1 | |
| Vicat (° C.) | 97.8 | 98.0 | 98.0 | 98.0 |
| Izod Impact Strength (ft-lb/in) | 2.1 | 1.9 | 2.2 | 2.0 |
| Specular Gloss at 60° | 19.5 | 24.4 | 18.2 | 23.5 |
| Tensile Stress at Yield (psi) | 2445 | 2371 | 2384 | 2333 |
| Tensile Strain at Break (%) | 52 | 60 | 42 | 61 |
| Tensile Modulus (kpsi) | 229 | 219 | 226 | 211 |
| Flexural Modulus (kpsi) | 282 | 269 | 274 | 262 |

As the data show, the constant stress ESCR and the constant strain ESCR significantly improved with the present impact modified styrenic polymer compared with the same HIPS not containing the PIB/LLDPE solution. Any reduction in physical property values is within practical commercial tolerances.

The present invention has been described with reference to specific details of particular embodiments thereof. It is not intended that such details be regarded as limitations upon the scope of the invention except insofar as and to the extent that they are included in the accompanying claims.

What is claimed is:

1. A method of improving the stress crack resistance of an impact modified styrenic polymer comprising, forming an impact modified styrenic polymer composition by, combining about 95 to about 99.5 wt. %, based on weight of said impact modified styrenic polymer composition, of an impact modified styrenic polymer with, about 0.5 to about 5 wt. %, based on weight of said impact modified styrenic polymer composition, of a polymer solution comprising, about 25 to about 75 wt. %, based on weight of said polymer solution, polyisobutylene, and about 25 to about 75 wt. %, based on weight of said polymer solution, of a polyolefin homopolymer selected from polyethylene homopolymer, low density polyethylene homopolymer, substantially linear polyethylene homopolymer, and high density polyethylene homopolymer.

2. The method according to claim 1, wherein the styrenic polymer contains monomer residues from styrenic monomers selected from the group consisting of styrene, p-methyl styrene, tertiary butyl styrene, dimethyl styrene, nuclear brominated or chlorinated derivatives thereof and combinations thereof.

3. The method according to claim 1, wherein the impact modified styrenic polymer contains an impact modifying polymer comprising monomer residues from styrene, butadiene, isoprene, acrylonitrile, ethylene, $C_3$ to $C_{12}$ alpha olefins, and combinations thereof.

4. The method according to claim 1, wherein the polyisobutylene has a number average molecular weight ranging from about 900 to about 2500.

5. The method according to claim 1, wherein the impact modified styrenic polymer is combined with the polymer solution by melt blending.

6. The method according to claim 1, wherein the difference between the solubility parameter of the polyisobutylene and the solubility parameter of the polyolefin homopolymer is not more than 1 $(cal/cm^3)^{1/2}$.

7. The method according to claim 1, wherein the difference between the solubility parameters of the components of the polymer solution and the solubility parameter of the styrenic polymer is not more than 1.5 $(cal/cm^3)^{1/2}$.

8. The method according to claim 1, wherein the difference between the solubility parameters of the components of the polymer solution and the solubility parameter of the impact modifying polymer is not more than 1 $(cal/cm^3)^{1/2}$.

9. An impact modified styrenic polymer composition prepared according to the method of claim 1.

10. The impact modified styrenic polymer composition according to claim 9, wherein the styrenic polymer contains monomer residues from styrenic monomers selected from the group consisting of styrene, p-methyl styrene, tertiary butyl styrene, dimethyl styrene, nuclear brominated or chlorinated derivatives thereof and combinations thereof.

11. The impact modified styrenic polymer composition according to claim 9, wherein the impact modified styrenic polymer contains an impact modifying polymer comprising monomer residues from styrene, butadiene, isoprene, acrylonitrile, ethylene, $C_3$ to $C_{12}$ alpha olefins, and combinations thereof.

12. The impact modified styrenic polymer according to claim 9, wherein the polyisobutylene has a number average molecular weight ranging from about 900 to about 2500.

13. The impact modified styrenic polymer composition according to claim 9, wherein the difference between the solubility parameter of the polyisobutylene and the solubility parameter of the polyolefin homopolymer is not more than 0.5 $(cal/cm^3)^{1/2}$.

14. The impact modified styrenic polymer composition according to claim 9, wherein the difference between the solubility parameters of the components of the polymer solution and the solubility parameter of the styrenic polymer is not more than 1.5 $(cal/cm^3)^{1/2}$.

15. The impact modified styrenic polymer composition according to claim 9, wherein the difference between the solubility parameters of the components of the polymer solution and the solubility parameter of the impact modifying polymer is not more than 1 $(cal/cm^3)^{1/2}$.

16. An impact modified styrenic polymer composition comprising:

(a) about 95 to about 99.5 wt. %, based on weight of said impact modified styrenic polymer composition, of an impact modified styrenic polymer comprising a styrenic polymer and an impact modifying polymer; and (b) about 0.5 to about 5 wt. %, based on weight of said impact modified styrenic polymer composition, of a polymer solution comprising, about 25 to about 75 wt. %, based on weight of said polymer solution, polyisobutylene, and about 25 to about 75 wt.%, based on weight of said polymer solution, of a polyolefin homopolymer selected from polyethylene homopolymer, low density polyethylene homopolymer, substantially linear polyethylene homopolymer, and high density polyethylene homopolymer;

wherein the difference between the solubility parameter of the polyisobutylene and the solubility parameter of the polyolefin homopolymer is not more than 0.5 $(cal/cm^3)^{1/2}$, the difference between the solubility parameters of the polymer solution components and the solubility parameter of the styrenic polymer is not more than 1.5 $(cal/cm^3)^{1/2}$, and the difference between the solubility parameters of the polymer solution components and the solubility parameter of the impact modifying polymer is not more than 1 $(cal/cm^3)^{1/2}$.

17. The impact modified styrenic polymer composition according to claim 16, wherein the styrenic polymer contains monomer residues from styrenic monomers selected from the group consisting of styrene, p-methyl styrene, tertiary butyl styrene, dimethyl styrene, nuclear brominated or chlorinated derivatives thereof and combinations thereof.

18. The impact modified styrenic polymer composition according to claim 16, wherein said impact modifying polymer comprises monomer residues from styrene, butadiene, isoprene, acrylonitrile, ethylene, $C_3$ to $C_{12}$ alpha olefins, and combinations thereof.

19. The impact modified styrenic polymer composition according to claim 16, wherein the polyisobutylene has a number average molecular weight ranging from about 900 to about 2500.

20. The impact modified styrenic polymer composition according to claim 16, wherein the impact modified styrenic polymer has an ESCR determined according to ASTM D1693 that is higher than the ESCR determined according to ASTM D1693 for an impact modified styrenic polymer of the same composition that does not contain the polymer solution.

* * * * *